United States Patent Office

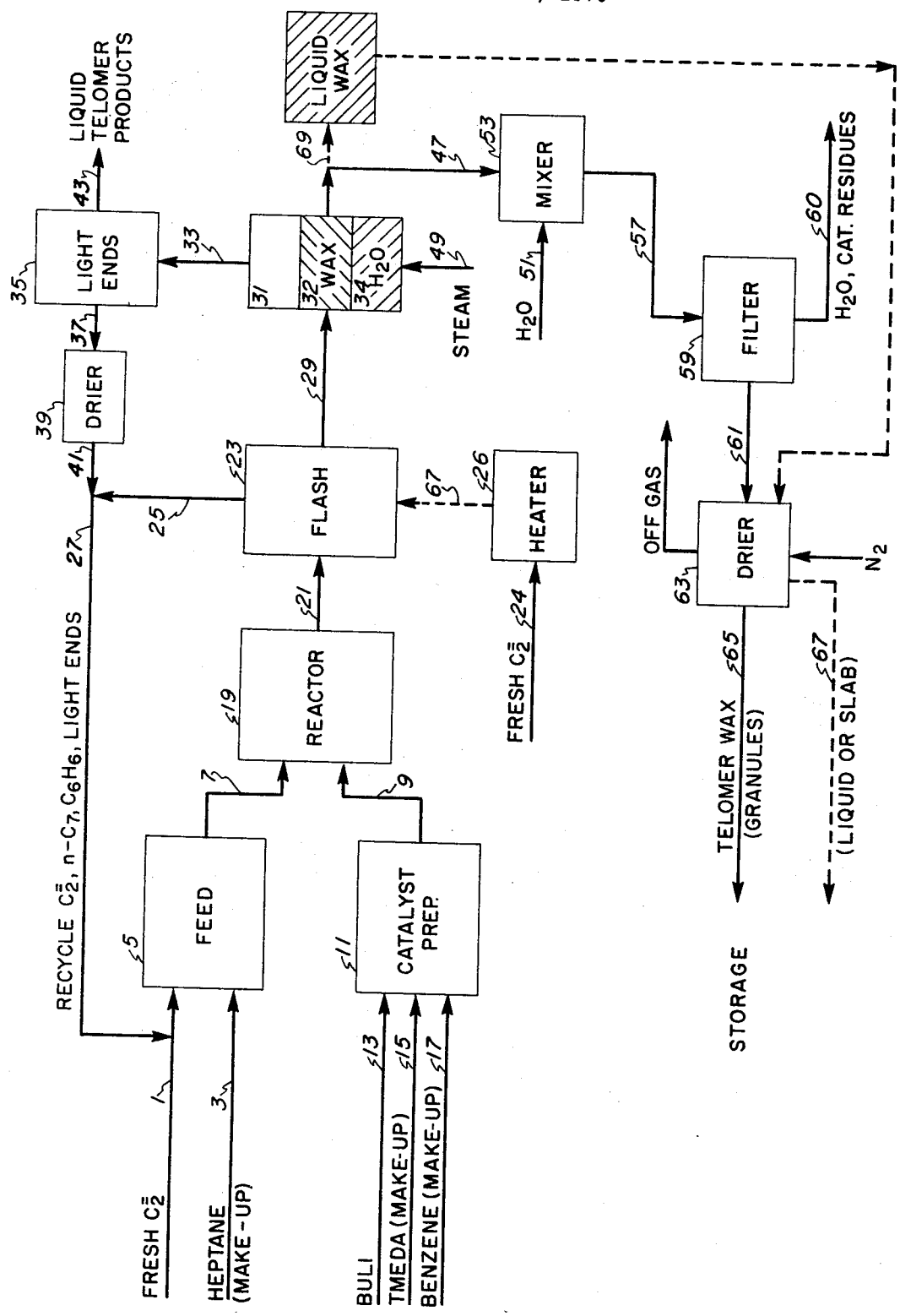

3,755,484
Patented Aug. 28, 1973

3,755,484
PROCESS FOR MAKING SYNTHETIC WAXES
Arthur W. Langer, Jr., Watchung, N.J., assignor to
Esso Research and Engineering Company
Filed Oct. 30, 1970, Ser. No. 85,606
Int. Cl. C08f 1/88
U.S. Cl. 260—671 B                                    8 Claims

ABSTRACT OF THE DISCLOSURE

An efficient, simplified wax finishing process which comprises steam-stripping the wax to remove light ends and catalyst residues; separating the wax from the aqueous phase containing the stripped catalyst residues and light ends and recovering the wax product.

This invention relates to a wax finishing process. In one aspect, this invention relates to steam stripping the wax to remove light ends and catalyst residues. In another aspect, it relates to flashing recycle monomer, solvents and catalyst back to the reactor.

There are many processes for manufacturing synthetic wax. Thus, synthetic waxes have been made using Ziegler catalysts, metal oxide catalysts, radical initiators, Fischer-Tropsch synthesis, etc. In the finishing and recovery of these waxes, it has always been necessary to employ a crystallization step in order to obtain high quality waxes as determined by softening point, melting point, molecular weight, etc. The crystallization of these waxes is often hampered because of the sticky or tacky nature of the product. In the filtering operations the wax tends to stick to the sides and gives rise to the plugging of the filters, pipes, outlets, etc., as such, it often becomes necessary for the operator to manually clear away the wax obstructions and sometimes shut down equipment for purposes of cleaning off the adhering, plugging and bridging wax, all of which means that the full efficiency of the equipment is not realized, operating expenses increase and capacity decreases.

Accordingly, an object of this invention is to improve the wax finishing processes; another object is to eliminate the need for a crystallization of the wax product by tailoring the reaction conditions such that the proper molecular weight, melting point and softening point of the high quality wax is formed in the reactor; further objects and advantages of this invention will become apparent from the following discussion, appending claims and the single figure of the accompanying drawing wherein a schematic flow sheet illustrates a representative process for finishing a wax which has been made by a telomerization process.

Briefly, this invention comprises the steps of steam stripping a wax product containing catalyst residues and undesirable light ends whereby the light ends are removed and an aqueous phase containing the catalyst residues is formed; separating the wax product from said aqueous phase and recovering the wax.

Although, as stated hereinabove, this wax finishing process would be suited to any type of synthetic wax process and the applicability of this invention is not to be limited to polyethylene type waxes but also includes copolymers, condensation polymers, degradation products from high polymers, etc., a specific wax synthesis is described for illustrating the improved wax recovery process.

Preferably, the process is suited to recovering the wax produced in a process described in U.S. Pat. 3,458,586 and in copending application Ser. No. 85,781 filed Oct. 30, 1970, which relates to preparing alkyl aromatic compounds from ethylene and aromatics. The process utilizes organolithium catalysts with ditertiary amine cocatalysts, preferably chelating ditertiary amines. The products range from liquids to hard waxes and they have various uses as pure compounds or as mixtures for making biodegradable detergents, oil additives, lubricants, bio-oxidation to cinnamic acid, etc. and as high melting synthetic waxes and wax additives. The reaction which covers this type of synthetic wax is generally referred to as telomerization.

With respect to the drawing, ethylene is passed from a source not shown via line 1 into a feed makeup tank 5. The mixture in the feed tank 5 is then passed via line 7 to the reactor 19. A suitable saturated hydrocarbon such as heptane is introduced into tank 5 via line 3.

In the catalyst preparation, butyllithium is passed from a source, not shown, via line 13 into the catalyst makeup tank 11. Tetramethylethylene diamine is introduced via line 15 into the tank 11 and a suitable inert diluent or a chain transfer agent such as an aromatic compound, e.g. benzene, is introduced via line 17 into tank 11.

The general conditions for preparing the organometallic chelated catalysts are described in Pat. 3,458,586. In the preferred process reaction of chelated butyllithium with benzene produces the chelated phenyllithium catalyst at ambient temperatures in less than 1 hour.

The ethylene and heptane are passed into reactor 19 and the catalyst is added via line 9 to the reactor 19.

The reactor conditions are set forth in a copending application, bearing S.N. 85,781 and filed on the 30th day of October, 1970.

Although the process is illustrated with benzene, other chain transfer agents such as olefins may be used in the telomerization reaction with the proper choice of conditions in the reactor to obtain the desired wax properties.

After the ethylene has been reacted with the benzene, in the presence of the butyllithium tetramethylethylene diamine catalyst complex, the reaction mixture comprising catalyst residues, light ends and wax product is passed via line 21 to a flash drum 23.

In those processes, such as the subject one, where it is of commercial advantage to recycle the solvent, the wax light ends, as well as the volatile catalyst components, the mixture is flashed or stripped in tank 23 with an inert stripping gas such as ethylene, nitrogen, methane, etc. Flashing is accomplished at about 120° to 220° C., preferably about 140° to 200° C. and about 50 to 200 p.s.i.g.

Alternatively, fresh ethylene is passed via line 24 into heater 26 wherein it is heated up to a temperature ranging from about 150° to 250° C., specifically 170° to 220° C. and passed via line 67 through the reaction mixture in tank 23. This hot ethylene carries the solvents, some telomer light ends and some of the catalyst chelating agent overhead in line 25 for recycle via line 27 to the ethylene makeup line 1. At this point none of the recycle material has been contaminated by exposure to catalyst poisons. Of course, one could fractionate the recycle mixture into its separate components, particularly the solvent fractions, to achieve better control over the recycle composition and to eliminate any build-up of by-products.

The tetramethylethylene diamine which is recycled in the preferred embodiment of this process results in substantial savings and catalyst costs and permits practical use of TMEDA/LiR ratios of 2:1 and higher, wherein the LiR is utilized more efficiently.

The liquid wax from flash tower 23 is pumped via line 29 to a steam-stripping vessel 31. The steam-stripping vessel contains a water phase 34 which removes the catalyst residues from the wax layer 32.

Steam at a pressure of 0 to 100 lbs./sq. in., preferably 30 to 80 lbs. sq./in. and a temperature of 100° to 200°

C., preferably 120° to 180° C. passes via line 49 through vessel 31.

Elevated pressures and superheated steam are maintained in tank 31 so as to maintain the wax in a liquid state; however, satisfactory catalyst removal can be achieved at atmospheric pressure under which conditions wax exists as granules or soft globules.

Wax light ends are taken overhead via line 33 into tank 35 where a portion of the light ends may be sold for conversion to various chemicals or additives and are removed via line 43 to storage. The remainder of the light ends are passed via line 37 to drier 39 and mixed via line 41 with the recycle line 27 where they are recycled for conversion to higher light wax.

The liquid wax may be removed via line 69 to a drier 63 where a suitable inert gas such as nitrogen is employed to dry the wax, after which it is removed via line 67 in liquid or slab form for storage. Preferably, the liquid wax is converted into granules or pellets by means of an underwater pelletizer.

Alternatively, the wet wax from the steam stripper 31 is passed via line 47 and coagulated with cold water in a mixing vessel 53.

The water phase in steam stripper 31 and/or mixer 53 is preferably acidified to maintain a pH of about 1-6 to facilitate complete removal of catalyst residues. HCl or long chain fatty acids are preferred.

The coarse granules are then removed via line 57 to filter 59 wherein the water and catalyst residues are removed via line 60. The wax granules are transferred via line 61 to drier 63 where they are dried to yield uniform hard granules which have a high bulk density and flow freely.

The wax granules then are removed via line 65 to storage not shown.

Although this wax recovery process has been demonstrated as a continuous process, it can also be utilized in a batch or semi-continuous process.

Although only one stripping stage is demonstrated in this invention, it is also within the scope of this invention to use more than one stage to accomplish any of the operations in the flow plan. For example, flashing may be carried out in two or three stages to permit separation of the recycle components under most favorable conditions. The first stage could drop pressure to an intermediate pressure such as 200 to 600 p.s.i.g. to take only ethylene overhead at substantial pressure to minimize recycle compression. A second stage could operate at still lower pressure and/or higher temperature to take recycle solvents overhead. Finally, a third stage could be utilized to take light ends from the wax.

EXAMPLE 1

Preparation of telomer wax

To 50 ml. benzene was added 3 mmoles BuLi (0.192 g.) and 6 mmoles TMEDA (0.696 g.) and the solution was allowed to age 20 min. at 25° C. After diluting with 450 ml. n-heptane, the solution was charged under nitrogen to a 1 l. stainless steel stirred autoclave with magnetic drive. The solution was heated to 75-80° C. and ethylene was charged rapidly while raising temperature to 100° C. and pressure to 1000 p.s.i.g. Ethylene was charged continuously to maintain 1000 p.s.i.g. for 5 hours.

(A) Conventional wax recovery and finishing.—In a conventional wax recovery procedure, the catalyst was killed by addition of a small amount of alcohol, then the total reactor product was added to 1 l. isopropyl alcohol to precipitate the wax at 25° C. After filtration, the wax was reslurried in 5 volumes of isopropyl alcohol, heated to 70° C., cooled slowly to 40-45° C. to crystallize the wax, filtered, rinsed with acetone and vacuum dried at 70° C. Yield=176 g. The wax was obtained as a fine, dusty powder with low bulk density. Crystallization and filtration were extremely slow (3-5 hours) due to the large volume of solvent and the highly solvated, soft wax which plugged the filter.

(B) Improved wax recovery and finishing.—The product was prepared in an identical run to that described above, but, it was recovered by a new simplified process. The total reactor product was pressured from the reactor at 100° C. and flashed to obtain a slurry. Gaseous products were vented. The slurry was distilled through a 7-inch Vigreux column until 500 ml. $H_2O$ was taken overhead in addition to the volatile hydrocarbon solvents and light ends. The wax slurry was converted into spheres which were separated rapidly by decantation from the water solution of catalyst residues. The wax was then dispersed into smaller wax chunks by rapid treatment with water in a Waring blender. The blended wax filtered rapidly, was rinsed with fresh water and vacuum dried at 80-85° C. Yield=181 g.

In contrast to the conventional process, this new process was much faster and simpler. It did not require alcohol or other solvents for crystallization; filtration took only seconds rather than hours, and the wax was obtained in attractive granular form rather than dusty powder.

A comparison of the waxes prepared by the two processes is given in the table below.

WAX EVALUATIONS

| Process | A | B |
| --- | --- | --- |
| Wax cut point | $\phi C_{28}$ | $\phi C_{19}$ |
| Percent selectivity to wax | 92.4 | 97 |
| $M_n$ | 1598 | 1347 |
| Softening point, ° F | 193 | 187 |
| Plateau M.P., ° F | 238.5 | 236.5 |

A higher selectivity to wax is obtained by process B because more low molecular weight products are included. This is reflected in slightly lower softening and melting points and molecular weight. However, these properties did not significantly affect the final properties in laminating wax formulations. Both products were superior to conventional formulations with respect to congealing point and wax migration at 125-150° F.

EXAMPLE 2

Preparation of telomer wax

The procedure of Example 1 was followed except that n-heptane was replaced by n-hexane.

(A) Conventional wax recovery and finishing.—Following the procedure of Example 1(A), the wax product was isolated, crystallized and dried, yielding 114.5 g. wax.

(B) Improved wax recovery and finishing.—Product was prepared in a duplicate experiment to that described above, but it was recovered by the new procedure described in Example 1(B). The yield was 114.7 g.

The products from A and B were examined for heat stability by placing a 3 g. sample of each in separate beakers and heating them simultaneously on a hot plate. Sample A melted with some gas evolution and turned rapidly to a dark straw color. Sample B gave a nearly water-white melt without gas evolution. Therefore, contacting the molten wax with boiling water and steam stripping was more effective in removing catalyst residues and volatiles than was the more expensive, time consuming crystallization method.

EXAMPLE 3

A telomer wax sample was prepared following the procedure of Example 1 except that the catalyst consisted of 6 mmoles BuLi and 6 mmoles TMEDA. The product was recovered using the improved procedure in Example 1(B).

This uninhibited sample was compared to a commercial, high quality microcrystalline wax (refined petroleum wax, M.P. 185° F.) in a heat stability test. The two samples were subjected simultaneously to circulating air at 270° F. for 7 days. The telomer wax sample turned dark yellow whereas the petroleum wax turned redbrown. Therefore, the improved wax finishing process gave a product with better heat stability, oxidation stability and color than a competitive commercial product.

EXAMPLE 4

Telomer wax preparations were made following the general procedure of Example 1. The recovery procedure of Example 1(B) was followed except that the 1 liter $H_2O$ was acidified to improve wetting of the wax and improxe extraction of chelating agent from the wax. In four experiments, there was added 0.25 ml. conc. $H_2SO_4$, 1 ml. conc. $H_2SO_4$, 1 ml. conc. HCl or 5 ml. conc. HCl. Better wetting was observed in all cases compared to the control without acid present. Storage of the wax samples in sealed bottles for 4 weeks gave products which had only a clean, wax odor. In contrast, the control run made in the absence of acid possessed an amine odor caused by traces of the chelating agent remaining in the wax. Therefore an acidic wash increases product quality. Although the pH required is dependent upon the volume of wash liquid, the preferred pH will normally be between about 1 and 6. HCl is preferred over $H_2SO_4$ because the latter may cause wax discoloration at high temperatures.

Other mineral acids or organic acids may be used in place of HCl as long as they do not contribute undesirable colors or odors in storage or in high temperature applications. Long chain fatty acids, such as stearic acid, may be used either during the water washing stage or added to the molten wax to neutralize any traces of amine present in the product.

EXAMPLE 5

Preparation of telomer wax

A 0.5 M solution of φLi●2TMEDA in benzene was prepared by aging a 0.5 M BuLi●2TMEDA solution for 19 days at room temperature. A solution of 3 mmoles φLi●2TMEDA in 55 ml. benzene was pressured with ethylene into the reactor at 95° C. and 800 p.s.i.g. ethylene pressure. Reaction conditions of 100° C. and 1000 p.s.i.g. were reached in a few minutes and maintained for 3 hours.

Wax recovery and finishing

The total reactor product was flashed into a vessel heated to 150–160° C. and heating was continued until all wax melted. Volatile products (330 g.) were condensed in traps from which 1.6 mmole TMEDA was recovered and identified as the dihydrochloride. The wax was stripped with $N_2$ at 200° C. for 30 min., 1 l. $H_2O$ was added, catalyst residues were extracted at 100° C. and the wax was recovered by filtration, blending with fresh water, filtering and drying. The volatiles recovered from the $N_2$ stripping weighed 26.7 g. The yield of high quality wax=176 g.

This example shows that solvent, chelating agent and telomer light ends may be separated for recycle from the wax in conventional flash drums with or without stripping by an inert gas; the soft or preferably molten wax may be water-washed to remove catalyst residues and the wax may be recovered in either the liquid or solid state. The wax may be waterwashed above 100° C. at elevated pressures in any conventional liquid-liquid contacting equipment and the water separated and removed in a settling tank. The molten wax may be stored in heated tanks, pelletized or molded into slabs. This recovery and finishing procedure is particularly attractive for continuous operation.

EXAMPLE 6

A telomer product was prepared following the general procedure of Example 5. The wax was recovered by separating solvent and volatiles in a flash tank in which ethylene gas was used to assist in stripping the wax to the desired cutpoint. After washing with hot water, the wax was converted into spherical particles by suitable agitation in water while cooling to 90–100° C. The wax separated instantly from the water on a coarse screen. It was rinsed with fresh water and dried, yielding 182 g. of high quality wax.

This procedure illustrates a highly simplified recovery and finishing process which requires a minimum of equipment and steps. By controlling the agitation conditions, the wax may be obtained as spherical particles of any desired size ranging from about 1 mm. to 2 cm. diameter.

What is claimed is:

1. In a wax process, wherein the wax is produced by reacting ethylene and aromatics in the presence of a catalyst formed by mixing components comprising organolithium and chelating ditertiary amines to form a reaction mixture comprising a liquid synthetic wax product, catalyst residues, solvent and wax light ends, the improvement therewith comprising the steps of steam stripping said reaction mixture thereby removing wax light ends from said mixture and simultaneously forming an aqueous layer which separates catalyst residues from said reaction mixture; contacting said aqueous phase with a water soluble acid of a sufficient strength to maintain a pH ranging from 1 to 6, and separating a synthetic liquid wax product from said aqueous layer and drying said wax product.

2. A process according to claim 1 wherein said inert gas is one selected from the group consisting of nitrogen, ethylene and methane.

3. A process according to claim 1 wherein said inert gas is ethylene.

4. A process according to claim 3 further including the step of recycling the monomer, solvent, telomer light ends, ethylene and volatile catalyst components to the reaction prior to the steam-stripping step.

5. A process according to claim 1 further including the step of pelletizing said wax product.

6. A process according to claim 1 further including the step of coagulating the wax into granules after the steam-stripping step, separating the wax granules from the aqueous layer and drying the wax granules.

7. A process according to claim 1 further including the step of pelletizing said wax products.

8. In a wax process, wherein the wax is produced by reacting ethylene and aromatics in the presence of a catalyst formed by mixing components comprising organolithium and chelating ditertiary amines to form a reactant mixture comprising a liquid synthetic wax product, catalyst residues, solvent and wax light ends; the improvement therewith comprising the steps of flashing or stripping the wax formed in said reaction with a gas inert to the synthetic liquid wax product, catalyst residues, solvent and wax light ends present in said reaction mixture, thereby removing some catalyst residues, telomer light ends and solvent from said wax product; steam stripping the liquid synthetic wax to remove telomer light ends from the wax and to form an aqueous layer contained in the catalyst residues; contacting said aqueous layer with a water soluble acid of a sufficient strength to maintain a pH ranging from 1 to 6, separating the liquid synthetic wax from said aqueous layer and drying the stripped wax whereby a liquid synthetic wax product producing excellent heat stability, oxidation stability and color stability is produced.

References Cited

UNITED STATES PATENTS 3,007,578  11/1961  Wride et al. _____ 260—94.9 F
3,458,586   7/1969  Langer, Jr. _____ 260—671 B

FOREIGN PATENTS 831,123   3/1960  Great Britain ____ 260—94.9 F

JOSEPH L. SCHOFER, Primary Examiner
A. HOLLER, Assistant Examiner

U.S. Cl. X.R.

260—93.7, 94.9 B, 94.9 F, 668 B

UNITED STATES PATENT OFFICE
CERTIFICATE OF CORRECTION

Patent No. 3,755,484         Dated August 28, 1973

Inventor(s) Arthur W. Langer, Jr.

It is certified that error appears in the above-identified patent and that said Letters Patent are hereby corrected as shown below:

Column 6, line 25, claim 2, the numeral "1" should read -- 8 --.
Column 6, line 28, claim 3, the numeral "1" should read -- 8 --.

Signed and sealed this 23rd day of July 1974.

(SEAL)
Attest:

McCOY M. GIBSON, JR.          C. MARSHALL DANN
Attesting Officer             Commissioner of Patents